No. 702,432. Patented June 17, 1902.
W. S. HUFFMAN.
VEHICLE TIRE.
(Application filed Nov. 28, 1900.)
(No Model.) 2 Sheets—Sheet 1.
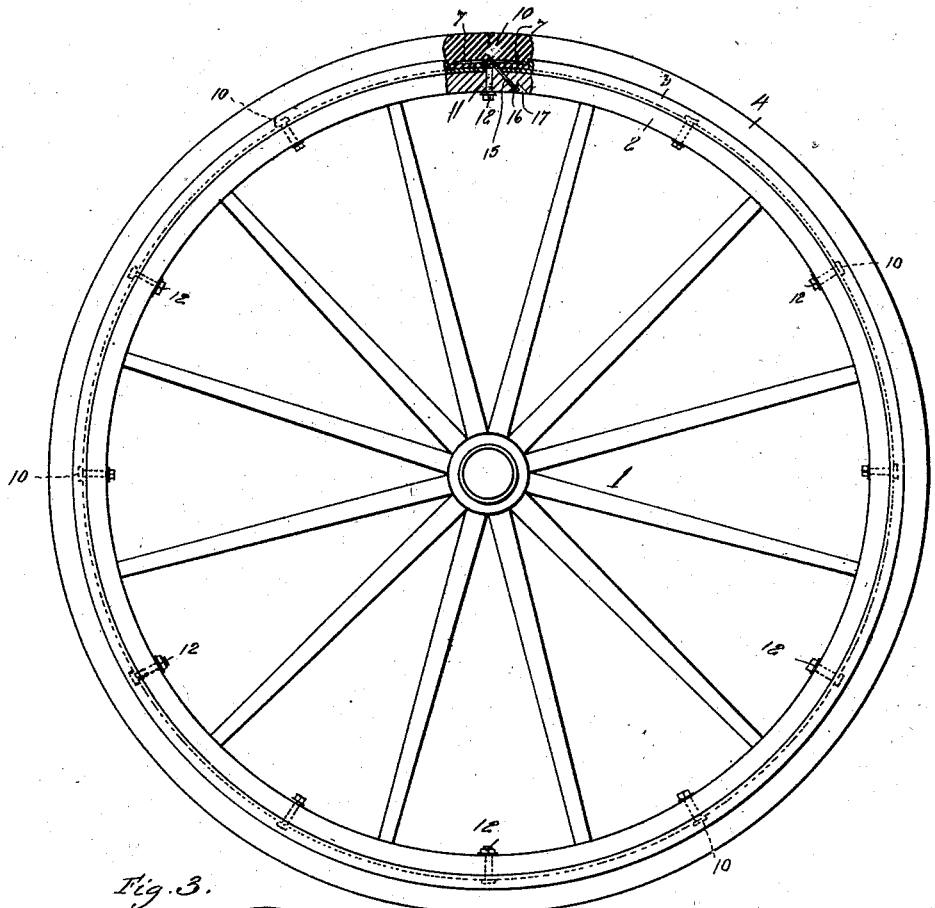
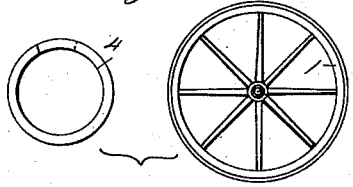
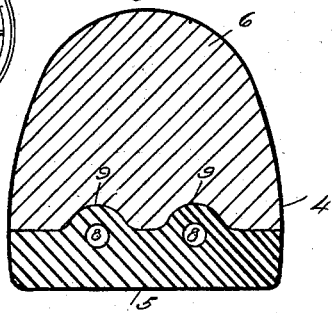
WITNESSES:
INVENTOR
William S. Huffman,
ATTORNEY.

No. 702,432. Patented June 17, 1902.
W. S. HUFFMAN.
VEHICLE TIRE.
(Application filed Nov. 28, 1900.)
(No Model.) 2 Sheets—Sheet 2.
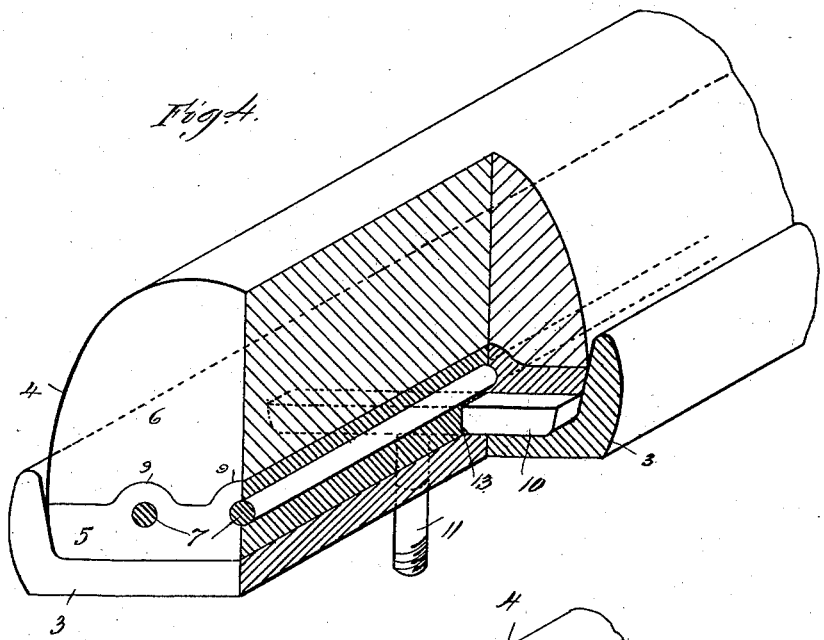
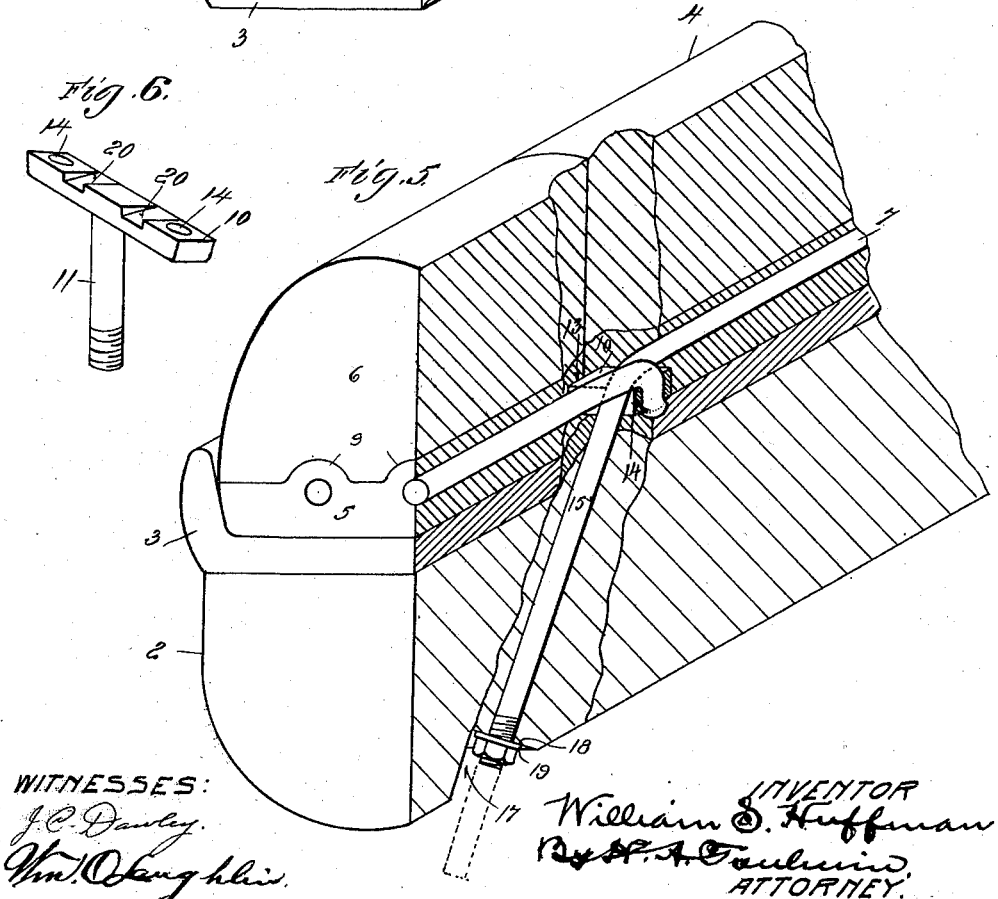
WITNESSES:
INVENTOR
William S. Huffman,
ATTORNEY.

UNITED STATES PATENT OFFICE.

WILLIAM S. HUFFMAN, OF BOSTON, MASSACHUSETTS.

VEHICLE-TIRE.

SPECIFICATION forming part of Letters Patent No. 702,432, dated June 17, 1902.

Application filed November 28, 1900. Serial No. 38,008. (No model.)

*To all whom it may concern:*

Be it known that I, WILLIAM S. HUFFMAN, a citizen of the United States, residing at Boston, in the county of Suffolk and State of Massachusetts, have invented certain new and useful Improvements in Vehicle-Tires, of which the following is a specification, reference being had therein to the accompanying drawings.

This invention relates to vehicle-tires, and more particularly to that class known as "rubber tires," and has for its objects, among other things, to produce a tire of superior durability in which the retaining wire or wires will not tend to cut the material of which the tire was composed and in which creeping and longitudinal movement of the tire in the channel will be prevented.

A further object of my invention is to provide a tire of this class in which the rubber composing the tread will be under compression when the tire is in place, such compression being obtained without the use of an excessive amount of rubber, thereby rendering the tire more economical. Yet another object of the invention is the provision of improved means for securing the ends of the retaining wire or wires.

To these and other ends the invention consists in certain novel features which I will now proceed to describe and will then particularly point out in the claims.

In the accompanying drawings, Figure 1 is an elevation, partly in section, of a vehicle-wheel having applied thereto a tire embodying my invention. Fig. 2 is an enlarged transverse sectional view of the tire detached. Fig. 3 is a view illustrating the relative diameters of the tire and wheel before the application of the former to the latter. Fig. 4 is an enlarged detail perspective view, partly in section, of the tire and metallic rim or channel. Fig. 5 is a view similar to Fig. 4, illustrating the mode of securing the ends of the retaining-wires; and Fig. 6 is a detail perspective view of a portion of the device.

In the drawings, 1 indicates a vehicle-wheel provided with the usual felly 2, to which is secured a channeled metallic rim 3, of the character usually employed in structures of this description. The tire proper is indicated at 4 and is constructed of rubber or other suitable elastic material having any approved form. That indicated in Fig. 2 is the form which I prefer. The body of the tire is composed of two parts, an inner or base portion 5 and an outer or tread portion 6. The base portion, which is seated within the groove of the channel-rim, is constructed of hard rubber, while the outer or tread portion 6, which projects beyond the flanges of the channel-rim, is constructed of a softer elastic material. The two portions of the tire are preferably joined by vulcanization, although they may be united in any other suitable manner.

In order to secure the tire within the channel-rim, I employ one or more retaining-wires 7, and in the present instance I have shown a structure in which two of these wires are employed. These wires are embedded in the body of the tire, and the said hard-rubber base 5 of the tire is provided with longitudinal apertures 8, within which the wires fit. By reason of this construction the wires are prevented from being drawn through the material of which the tire is composed toward the rim of the wheel, thereby cutting and destroying the material of which the tire is composed, as is the case where a tire entirely composed of soft rubber is employed, since the hard rubber offers a sufficient resistance to the cutting action of the wires to prevent the same.

In order to obtain a maximum amount of material between the retaining-wires and the bottom of the tire without unduly increasing the proportion of hard rubber and decreasing the proportion of resilient material furnished by the soft rubber, I provide the outer face of the hard-rubber base of the tire with longitudinal ribs 9, corresponding in location with the apertures 8 and permitting said apertures to be located at a maximum distance from the base of the tire, while at the same time they provide for a proper thickness of hard rubber outward beyond the retaining-wires. These ribs, moreover, also serve to produce a firmer and more effective union between the two portions of the tire, since they provide an increased contact-surface between the two and also act as shoulders to resist and prevent separation in a lateral direction.

In rubber tires as ordinarily constructed it is customary, in order that the tire when applied to the wheel shall present a tread-surface which is in a condition of compression, to provide a tire of greater length than the circumference of the wheel to which it is to be applied and to then compress the tire upon the retaining-wires before it is applied to the wheel. This process involves the use of a greater amount of rubber than is necessary to encircle the rim of the wheel. I propose to avoid the use of this excess of rubber by molding my improved tire of a diameter less than that of the wheel to which it is to be applied, as indicated in Fig. 3 of the drawings, the total length of the tire being just sufficient to encircle the wheel and the ends of the tire overlapping, so that when the tire is applied to the wheel the enlargement of its diameter resulting therefrom will cause the surface or tread portion of the tire to become compressed. By this means surface compression of the rubber is obtained without the employment of an amount of rubber in excess of that required to encircle the wheel. Moreover, tires thus constructed may be molded in continuous coils of the helix type and may be cut off in length as desired.

In tires of the wired-on type difficulty has frequently been experienced by reason of the creeping or longitudinal movement of the tire in the rim, resulting in cutting of the tire by the wires and other damage. In order to obviate this difficulty, I provide within the channeled metallic rim 3 a plurality of cross-bars 10, which extend transversely of the bottom of the channel, projecting above the surface thereof and being secured thereto in any suitable manner. I prefer, however, to employ for this purpose the construction shown, in which each cross-bar 10 is provided with a shank 11 of sufficient length to extend through the rim and felly, its extremity being threaded and projecting beyond the inner surface of the felly sufficiently to receive a nut 12, by means of which the cross-bar is securely clamped in place. By reason of this construction the same means which serve to hold the cross-bar in place also serve to hold the rim in place upon the wheel, and the tire-bolts usually employed for this purpose are thereby dispensed with. In order to coöperate with the cross-bars 10, I provide the hard-rubber base portion of the tire with corresponding transverse grooves or recesses 13, which fit over and interlock with the cross-bars and effectually prevent any longitudinal movement of the tire relatively to the rim. By reason of the comparatively rigid character of the material of which the base of the tire is composed this interlocking is rendered effectual and creeping of the tire is positively prevented.

It will be observed that the cross-bars 10 are of such a length that they extend entirely across the bottom of the channel, their ends abutting against the inner faces of the flanges thereof in such a way as to effectually prevent any turning of the bar, which is thus firmly locked in position.

In order to secure the ends of the retaining wire or wires after the tire is in position, I provide one of the cross-bars 10, which is located at the junction of the ends of the tire, with apertures 14, which are adapted to receive the ends of the retaining-wires, said ends being inserted through said apertures and then headed or riveted, as indicated in Fig. 5. This connection may be made before the parts are assembled. The other ends of the wires are extended outward through passages 15 in the rim and felly and project beyond the latter to an extent sufficient to permit them to be firmly grasped and drawn tight by any suitable means. These ends are provided with threads to receive nuts 16, which fit within recesses 17 in the inner face of the felly, as shown in Figs. 1 and 5, and bear against a shoulder 18 of said recesses to hold the wires in place after having been pulled taut. If desired, a washer 19 may be interposed between each nut and its bearing-shoulder 18. The projecting ends of the retaining-wires, which are indicated by dotted lines in Fig. 5, may be readily cut off by a suitable instrument after the wires have been drawn taut and secured, so as to obviate any projection thereof on the inside of the felly.

It will be observed that the inwardly-extending ends of the retaining-wires pass over that one of the cross-bars 10 to which the inner ends of said wires are secured, and in order to prevent strain and cutting of the wires at the crossing-points said cross-bar is provided with inclined seats 20, as shown more particularly in Fig. 6 of the drawings, so that all danger of fracture of the wires by cutting or by bending at too sharp an angle at these points is obviated.

I do not wish to be understood as limiting myself to the precise details of construction hereinbefore set forth, since it is obvious that these details may be varied without departing from the principle of my invention. For instance, although I have illustrated a construction employing two retaining-wires, yet the several features described and claimed may be embodied in a structure in which a single retaining-wire or more than two retaining-wires are employed, and in either case the form of the retaining device in cross-section may be varied as deemed advisable.

Having thus fully described my invention, what I claim as new, and desire to secure by Letters Patent, is—

1. A vehicle-tire comprising a base or inner portion of hard rubber and a tread or outer portion of soft rubber, said portions being permanently united to form a unitary structure, and retaining devices located wholly within the hard-rubber base portion and consisting of retaining-wires located in longitudinal apertures in said base portion, the soft-rubber portion of the tire having no retaining devices located therein, substantially as described.

2. A vehicle-tire, comprising a hard-rubber base and a soft-rubber tread, the base being provided with a longitudinal aperture or apertures to receive a retaining wire or wires and having a corresponding rib or ribs on its outer surface, substantially as described.

3. A vehicle-tire, comprising a relatively thin base of hard rubber provided with longitudinal apertures and with corresponding ribs on its outer surface, and a relatively thick tread portion of soft rubber having its inner surface adapted to fit the outer surface of the base and permanently united thereto, substantially as described.

4. A vehicle-tire provided with a soft-rubber tread and a hard-rubber base, said base having transverse grooves or recesses in its under side, in combination with a channeled rim to receive said tire, a plurality of bars located at intervals transversely of the rim and adapted to fit the recesses of the tire-base, each bar being provided with a shank or projection engaging the rim and having its ends abutting against the flanges of the rim to prevent displacement of the bar, and suitable retaining-wires extending through the tire, substantially as described.

5. The combination with a tire having a soft-rubber tread and a hard-rubber base provided at intervals with transverse grooves or recesses, of a channeled rim to receive said tire, a plurality of bars located at intervals transversely of the rim and adapted to fit the recesses of the tire-base, each bar being provided with a shank or projection engaging the rim, and suitable retaining-wires under tension extending through the tire outside of the bars, substantially as described.

6. The combination with a tire having a soft-rubber tread and a hard-rubber base provided at intervals with transverse recesses, of a wheel having a felly and a channeled rim apertured at suitable intervals, a plurality of cross-bars adapted to fit transversely in the channel and to engage the recesses of the tire-base, each cross-bar being provided with a shank adapted to extend through the corresponding apertures of the rim and felly and threaded at its outer end, and nuts fitting the projecting threaded ends of said shanks and suitable retaining-wires under tension extending through the tire outside of the bars, substantially as described.

7. The combination with a felly and a channeled metallic rim, of a transverse bar fitting therein and removably connected therewith, said cross-bar being provided with apertures, a longitudinally-apertured elastic tire fitting said rim, and retaining-wires extending through said apertures, one end of each wire being secured in the corresponding aperture of the cross-bar by riveting or otherwise and the other end of each wire extending through a suitable passage in the rim and felly to the interior of the latter, and threaded at its projecting end, and nuts mounted on said threaded ends, substantially as described.

8. A vehicle-wheel, comprising a felly and a channeled metallic rim provided with a cross-bar fitting and detachably connected therewith, said cross-bar being provided with apertures to receive the inner ends of the retaining-wires, an elastic tire fitting said channeled rim and provided with longitudinal apertures, and retaining-wires extending through said apertures, having their inner ends secured in the apertures of the cross-bar and their outer ends extending through passages in the rim and felly and threaded, and nuts mounted on said threaded portions, the felly being provided with shouldered recesses to receive said nuts, substantially as described.

9. In a tire of the character described, the combination with a metallic channeled rim and a longitudinally-apertured elastic tire fitting therein, of retaining-wires, and a cross-bar fitting within the channeled rim and detachably connected therewith, the inner ends of the retaining-wires being secured to said cross-bar and said cross-bar being provided with inclined seats for the other ends of said wires, which extend over said cross-bar to the inner edge of the wheel, substantially as described.

In testimony whereof I affix my signature in presence of two witnesses.

WILLIAM S. HUFFMAN.

Witnesses:
ARTHUR E. THAYER,
F. R. SHATTUCK.